US009128507B2

(12) United States Patent
Summer et al.

(10) Patent No.: US 9,128,507 B2
(45) Date of Patent: Sep. 8, 2015

(54) COMPACT HAPTIC INTERFACE

(71) Applicant: HARRIS CORPORATION, Melbourne, FL (US)

(72) Inventors: Matthew D. Summer, Melbourne, FL (US); Paul M. Bosscher, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 144 days.

(21) Appl. No.: 14/143,045

(22) Filed: Dec. 30, 2013

(65) Prior Publication Data

US 2015/0185755 A1 Jul. 2, 2015

(51) Int. Cl.

| | |
|---|---|
| ***F16H 19/04*** | (2006.01) |
| ***G05G 1/02*** | (2006.01) |
| ***G05G 1/04*** | (2006.01) |
| ***G05G 1/10*** | (2006.01) |
| ***G05G 25/00*** | (2006.01) |

(52) U.S. Cl.

CPC .. *G05G 1/02* (2013.01); *G05G 1/04* (2013.01); *G05G 1/10* (2013.01); *G05G 25/00* (2013.01)

(58) Field of Classification Search

CPC ............. G05G 1/02; G05G 1/04; G05G 1/10; G05G 25/00; F16H 19/04; F16H 19/043

USPC ......................... 74/29, 30, 661, 665 A, 665 C

See application file for complete search history.

(56) References Cited

U.S. PATENT DOCUMENTS 3,280,991 A 10/1966 Melton
3,637,092 A 1/1972 George et al.
4,216,467 A 8/1980 Colston
4,521,685 A 6/1985 Rebman
4,604,016 A 8/1986 Joyce (Continued)

FOREIGN PATENT DOCUMENTS

EP 0672507 A1 9/1995
EP 1 876 505 A1 1/2008

(Continued)

OTHER PUBLICATIONS

Information about Related Patents and Patent Applications, see section 6 of the accompanying information Disclosure Statement Letter, which concerns Related Patents and Patent Applications.

(Continued)

*Primary Examiner* — Ha D Ho

(74) *Attorney, Agent, or Firm* — Robert J. Sacco, Esq.; Fox Rothschild LLP

(57) ABSTRACT

Compact haptic interface (100) includes a base (102) and a yoke (304) rotatably disposed within the base. A first drive coupling (312) between a first motor (301) and the yoke rotates the yoke about a yoke axis (308). A carrier (306) is mounted to the yoke and rotatable about a carrier axis (310) transverse to the yoke axis. A rod (110) mounted to the carrier extends along a rod axis (346) transverse to the yoke axis and the carrier axis. A second drive coupling (314) rotates the carrier about the carrier axis responsive to operation of a second motor (302) which is mounted to the yoke. A third motor (303) is supported on the carrier and rotatable with the carrier about the carrier axis of rotation. A third drive coupling (340) facilitates linear movement of the rod along a linear direction responsive to operation of the third motor.

20 Claims, 16 Drawing Sheets

(56) References Cited

U.S. PATENT DOCUMENTS

| | | | | |
|---|---|---|---|---|
| 4,655,673 | A | 4/1987 | Hawkes | |
| 4,661,032 | A | 4/1987 | Arai | |
| 4,762,006 | A | 8/1988 | Asakawa et al. | |
| 4,791,588 | A | 12/1988 | Onda et al. | |
| 4,795,296 | A | 1/1989 | Jau | |
| 4,837,734 | A | 6/1989 | Ichikawa et al. | |
| 4,842,308 | A | 6/1989 | Spotts | |
| 4,853,874 | A | 8/1989 | Iwamoto et al. | |
| 4,860,215 | A | 8/1989 | Seraji | |
| 4,862,751 | A | 9/1989 | Asakawa et al. | |
| 4,893,254 | A | 1/1990 | Chan et al. | |
| 4,893,981 | A | 1/1990 | Yoshinada et al. | |
| 4,975,856 | A | 12/1990 | Vold et al. | |
| 5,004,391 | A | 4/1991 | Burdea | |
| 5,007,300 | A | 4/1991 | Siva | |
| 5,018,922 | A | 5/1991 | Yoshinada et al. | |
| 5,092,645 | A | 3/1992 | Okada | |
| 5,178,032 | A * | 1/1993 | Zona et al. | 74/479.01 |
| 5,184,319 | A | 2/1993 | Kramer | |
| 5,193,963 | A | 3/1993 | McAffee et al. | |
| 5,231,693 | A | 7/1993 | Backes et al. | |
| 5,382,885 | A | 1/1995 | Salcudean et al. | |
| 5,413,454 | A | 5/1995 | Movsesian | |
| 5,430,643 | A | 7/1995 | Seraji | |
| 5,451,924 | A | 9/1995 | Massimino et al. | |
| 5,508,596 | A | 4/1996 | Olsen | |
| 5,565,891 | A | 10/1996 | Armstrong | |
| 5,589,828 | A | 12/1996 | Armstrong | |
| 5,619,180 | A | 4/1997 | Massimino et al. | |
| 5,648,897 | A | 7/1997 | Johnson et al. | |
| 5,694,013 | A | 12/1997 | Stewart et al. | |
| 5,737,500 | A | 4/1998 | Seraji et al. | |
| 5,792,165 | A | 8/1998 | Klieman et al. | |
| 5,831,408 | A | 11/1998 | Jacobus et al. | |
| 6,028,593 | A | 2/2000 | Rosenberg et al. | |
| 6,047,610 | A | 4/2000 | Stocco et al. | |
| 6,084,587 | A | 7/2000 | Tarr et al. | |
| 6,088,017 | A | 7/2000 | Tremblay et al. | |
| 6,104,158 | A | 8/2000 | Jacobus et al. | |
| 6,178,775 | B1 | 1/2001 | Higginbotham et al. | |
| 6,184,868 | B1 | 2/2001 | Shahoian et al. | |
| 6,191,796 | B1 | 2/2001 | Tarr | |
| 6,246,390 | B1 | 6/2001 | Rosenberg | |
| 6,271,833 | B1 | 8/2001 | Rosenberg et al. | |
| 6,281,651 | B1 | 8/2001 | Haanpaa et al. | |
| 6,522,952 | B1 | 2/2003 | Arai et al. | |
| 6,535,793 | B2 | 3/2003 | Allard | |
| 6,592,315 | B2 | 7/2003 | Osborne, Jr. | |
| 6,636,161 | B2 | 10/2003 | Rosenberg | |
| 6,705,871 | B1 | 3/2004 | Bevirt et al. | |
| 6,781,569 | B1 | 8/2004 | Gregorio et al. | |
| 6,793,653 | B2 | 9/2004 | Sanchez et al. | |
| 6,801,008 | B1 | 10/2004 | Jacobus et al. | |
| 6,857,878 | B1 | 2/2005 | Chosack et al. | |
| 7,138,981 | B2 | 11/2006 | Kim et al. | |
| 7,158,112 | B2 | 1/2007 | Rosenberg et al. | |
| 7,168,748 | B2 | 1/2007 | Townsend et al. | |
| 7,208,900 | B2 | 4/2007 | Carlson et al. | |
| 7,225,404 | B1 | 5/2007 | Zilles et al. | |
| 7,345,672 | B2 | 3/2008 | Jacobus et al. | |
| 7,411,576 | B2 * | 8/2008 | Massie et al. | 345/156 |
| 7,480,600 | B2 | 1/2009 | Massie et al. | |
| 7,714,895 | B2 | 5/2010 | Pretlove et al. | |
| 7,783,384 | B2 | 8/2010 | Kraft | |
| 7,933,667 | B2 | 4/2011 | Sjoberg et al. | |
| 8,226,072 | B2 | 7/2012 | Murayama | |
| 8,373,391 | B1 | 2/2013 | Allen et al. | |
| 8,447,440 | B2 | 5/2013 | Phillips et al. | |
| 8,473,101 | B2 | 6/2013 | Summer | |
| 8,950,286 | B2 * | 2/2015 | Gosselin et al. | 74/490.06 |
| 2001/0002098 | A1 | 5/2001 | Haanpaa et al. | |
| 2001/0037163 | A1 | 11/2001 | Allard | |
| 2003/0169235 | A1 | 9/2003 | Gron et al. | |
| 2004/0189675 | A1 | 9/2004 | Pretlove et al. | |
| 2004/0254771 | A1 | 12/2004 | Riener et al. | |
| 2005/0087373 | A1 | 4/2005 | Wakitani et al. | |
| 2005/0252329 | A1 | 11/2005 | Demers | |
| 2006/0048364 | A1 | 3/2006 | Zhang et al. | |
| 2006/0066574 | A1 | 3/2006 | Kim et al. | |
| 2006/0117258 | A1 | 6/2006 | Yu | |
| 2006/0178775 | A1 | 8/2006 | Zhang et al. | |
| 2007/0013336 | A1 | 1/2007 | Nowlin et al. | |
| 2007/0050139 | A1 | 3/2007 | Sidman | |
| 2007/0095582 | A1 | 5/2007 | Stuijt et al. | |
| 2008/0009971 | A1 | 1/2008 | Kim et al. | |
| 2008/0063400 | A1 | 3/2008 | Hudson et al. | |
| 2008/0161733 | A1 | 7/2008 | Einav et al. | |
| 2008/0266254 | A1 | 10/2008 | Robbins et al. | |
| 2009/0074252 | A1 | 3/2009 | Dariush et al. | |
| 2009/0182436 | A1 | 7/2009 | Ferrara | |
| 2009/0234499 | A1 | 9/2009 | Nielsen et al. | |
| 2010/0019890 | A1 | 1/2010 | Helmer et al. | |
| 2010/0023185 | A1 | 1/2010 | Terwelp et al. | |
| 2010/0041991 | A1 | 2/2010 | Roundhill | |
| 2010/0070079 | A1 | 3/2010 | Mangaser et al. | |
| 2010/0084513 | A1 | 4/2010 | Gariepy et al. | |
| 2010/0092267 | A1 | 4/2010 | Najdovski et al. | |
| 2010/0100256 | A1 | 4/2010 | Jurmain et al. | |
| 2010/0168918 | A1 | 7/2010 | Zhao et al. | |
| 2010/0169815 | A1 | 7/2010 | Zhao et al. | |
| 2010/0172733 | A1 | 7/2010 | Chalubert et al. | |
| 2010/0259614 | A1 | 10/2010 | Chen | |
| 2011/0015569 | A1 | 1/2011 | Kirschenman et al. | |
| 2011/0046781 | A1 | 2/2011 | Summer | |
| 2011/0106339 | A1 | 5/2011 | Phillips et al. | |
| 2011/0144828 | A1 | 6/2011 | Chengalva | |
| 2011/0155785 | A1 | 6/2011 | Laurent et al. | |
| 2011/0257786 | A1 | 10/2011 | Caron L'Ecuyer et al. | |
| 2012/0095619 | A1 | 4/2012 | Pack et al. | |
| 2012/0150351 | A1 | 6/2012 | Bosscher et al. | |
| 2012/0184955 | A1 | 7/2012 | Pivotto et al. | |
| 2012/0185098 | A1 | 7/2012 | Bosscher et al. | |
| 2012/0185099 | A1 | 7/2012 | Bosscher et al. | |
| 2012/0294696 | A1 | 11/2012 | Summer et al. | |
| 2012/0306741 | A1 | 12/2012 | Gupta | |
| 2013/0090194 | A1 * | 4/2013 | Ferlay et al. | 474/64 |
| 2013/0328770 | A1 | 12/2013 | Parham | |
| 2014/0031983 | A1 | 1/2014 | Low et al. | |

FOREIGN PATENT DOCUMENTS

| | | | |
|---|---|---|---|
| FR | 2 898 824 | A1 | 9/2007 |
| GB | 2 228 783 | A | 9/1990 |
| WO | 95 30571 | A1 | 11/1995 |
| WO | 03 055061 | A1 | 7/2003 |
| WO | 2006 016799 | A1 | 2/2006 |
| WO | 2007051000 | A2 | 5/2007 |
| WO | 2008 135978 | | 11/2008 |
| WO | 2010 040215 | A1 | 4/2010 |
| WO | 2010/085184 | A1 | 7/2010 |
| WO | 2011075093 | | 6/2011 |

OTHER PUBLICATIONS

European Search Report mailed Mar. 14, 2012, Application Serial No. 11009319.2-2316, in the name of Harris Corporation.

Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.

Cheung, Y., et al., "Cooperative Control of a Multi-Arm System Using Semi-Autonomous Telemanipulations and Adaptive Impedance", Advanced Robotis, 2009, ICAR 2009. International Conference on, IEEE, Piscataway, NJ, USA, Jun. 22, 2009, pp. 1-7.

Suzuki, A., et al., "Performance conditioning of time delayed bilaterial teleoperation system by scaling down compensation value of communication disturbance observer", Advanced Motion Control, 2010, 11th IEEE International Conference On, IEEE, Piscataway, NJ, USA, Mar. 12, 2010, pp. 524-529.

Tzafestas, C., et al., "Adaptive impedance control in haptic teleoperation to improve transparency under time-delay", 2008 IEEE Interna-

(56) References Cited

OTHER PUBLICATIONS tional Conference on Robotics and Automation. The Half-Day Workshop on: Towards Autonomous Agriculture of Tomorrow, IEEE-Piscataway, NJ, USA, Piscataway, NJ, USA, May 19, 2008, pp. 212-219.
International Search Report mailed May 23, 2012; Application Serial No. PCT/US2011/066873 in the name of Harris Corporation.
Everett L J et al; "Automatic Singularity Avoidance Using Joint Variations in Robot Task Modification", IEEE Robotics & Automation Magazine, IEEE Service Center, Piscataway, NJ, US, vol. 1, No. 3, Sep. 1, 1994, pp. 13-19, XP011420425.
Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1996 L EEE/RSJ International Conference on Osaka, Japan, Nov. 4-8, 1996, New York, NY, USA, IEEE, vol. 2, 4, Nov. 1996, pp. 425-430, XP010212433.
Hamid Abdi et al: "Joint Velocity Redistribution for Fault Tolerant Manipulators", Robotics Automation and Mechatronics (RAM), 2010 IEEE Conference ON, IEEE, Piscataway, NJ, USA, Jun. 28, 2010, pp. 492-497, XP031710198.
International Search Report mailed Jun. 28, 2012, Application Serial No. PCT/US2012/027475 in the name of Harris Corporation.
Marshall, W.C., et al., "A Testbed for Design of User-Friendly, Multiple-Degree-Of-Freedom, Manual Controllers", Scientific Honeyweller, Honeywell's Corporate. Minneapolis, US Jan. 1, 1993, pp. 78-86.
International Search Report dated Oct. 29, 2012; Application Serial No. PCT/US2012/034207 in the name of Harris Corporation.
International Search Report dated Jan. 15, 2013, Application Serial No. PCT/US2012/037751 in the name of Harris Corporation.
International Search Report mailed Jan. 4, 2013, International Application Serial No. PCT/US2012/058303 in the name of Harris Corporation.
Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.
Rogers, JE., et al., "Bi-directional Gap Closing MEMS Actuator Using Timing and Control Techniquest", IEEE Industrial Electronics, IECON 2006-32nd Annual Conference on, IEEE, Piscataway, NJ USA Nov. 1, 2006, pp. 3469-3154.
Alqasemi R et al: "Kinematics, control and redundancy resolution of a 9-DoF wheelchair-mounted robotic arm system for ADL tasks",Mechatronics and Its Applications, 2009. ISMA '09. 6th International Symposium on, IEEE, Piscataway, NJ, USA, Mar. 23, 2009, pp. 1-7.
Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998, pp. 2580-2585.
Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004, pp. 2790-2796.
International Search Report mailed May 2, 2013, International Application No. PCT/US2012/051314, in the name of Harris Corporation.
Torres Rocco, A.C., "Development and testing of a new C-based algorithm to control 9-degree-of-freedom wheelchair-mounted-robotic-arm system". Jun. 1, 2010, Univ. of So. Florida.
Alqasemi, R., et al., "Maximizing Manipulation Capabilities for People with Disabilities Using 9-DoF Wheelchair Mounted Robotic Arm System", 2007, IEEE.
International Search Report mailed May 12, 2014, Applicaiton Serial No. PCT/US2013/069071, in the name of Harris Corporation.
Tijsma, et al., "A framework of interface improvements for designing new user interfaces for the MANUS robot arm", 2005, IEEE, 9th International Conference on Rehabilitation Robotics, Jul. 28-Jul. 1, 2005, Chicago, IL, USA.
Tijsma, H.A. et al., A Framework of Interface Improvements for Designing New User Interfaces for the MANUS Robot Arm, Proceedings of the 2005 IEEE, 2005, 235-240.
Rocco, Ana Catalina Torres, Development and testing of a new C-based algorithm to control a 9-degree-of-freedom wheelchair-mounted-robotic-arm system, University of South Florida, Jun. 1, 2010.

* cited by examiner

COMPACT HAPTIC INTERFACE

BACKGROUND OF THE INVENTION

Statement of the Technical Field

The inventive arrangements relate to haptic interfaces, and more particularly to compact haptic interfaces which are designed to integrate with a primary controller.

Description of the Related Art

Remote controlled unmanned vehicles are increasingly being used in a wide variety of robot applications such as explosive ordinance disposal, search and rescue operations, undersea salvage, and oil rig inspection/maintenance. As interest grows in robotic systems, providers are seeking to add haptic (force feedback) capability to their controllers. In many systems, a basic laptop-style controller already exists but these systems do not offer haptic feedback. Accordingly, there is a need for a haptic controller that can be used in connection with existing laptop-style controllers.

In many scenarios in which robots are used, conventional haptic interfaces are not well suited. These conventional haptic interfaces often have a form factor which lacks compactness and therefore do not work well. For example, conventional haptic interfaces are often designed for desktop consumer usage as opposed to mobile or portable robot operations. As such, these existing systems tend to be too large or have a form factors that makes them impractical for many applications.

SUMMARY OF THE INVENTION

Embodiments of the invention concern a compact haptic interface. The compact haptic interface includes a base and a yoke rotatably disposed within the base. A first motor is mounted stationary within the base. A first drive coupling provided between the first motor and the yoke is arranged to facilitate rotation of the yoke about a yoke axis responsive to operation of the motor. A carrier is mounted to the yoke and rotatable about a carrier axis transverse to the yoke axis. A rod is mounted to the carrier, and extends along a rod axis transverse to the yoke axis and the carrier axis. The rod terminates at a grip end spaced apart from the yoke. A second motor is supported on the yoke. A second drive coupling is arranged to facilitate rotation of the carrier about the carrier axis responsive to operation of the second motor. A third motor is supported on the carrier and rotatable with the carrier about the carrier axis of rotation. A third drive coupling is arranged to facilitate linear movement of the rod along a linear direction defined by the rod axis responsive to operation of the third motor. A grip assembly is disposed at the grip end and includes a grip which movable relative to the grip end.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

A compact haptic interface as disclosed herein can be configured as a stand-alone robot control system which includes all power, communication, and processing circuitry needed for remotely controlling a robot device. However, the design of the device is optimized for use with a laptop computer in a portable or mobile environment. As such, the compact haptic interface described herein is designed to be mechanically compact and lightweight. It has a narrow footprint which allows it to fit on the side of a standard operator console as an add-on manipulation controller. Importantly, the mechanical arrangement of the system is optimized to facilitate its highest levels of haptic force output in preferred directions.

Figure 1:
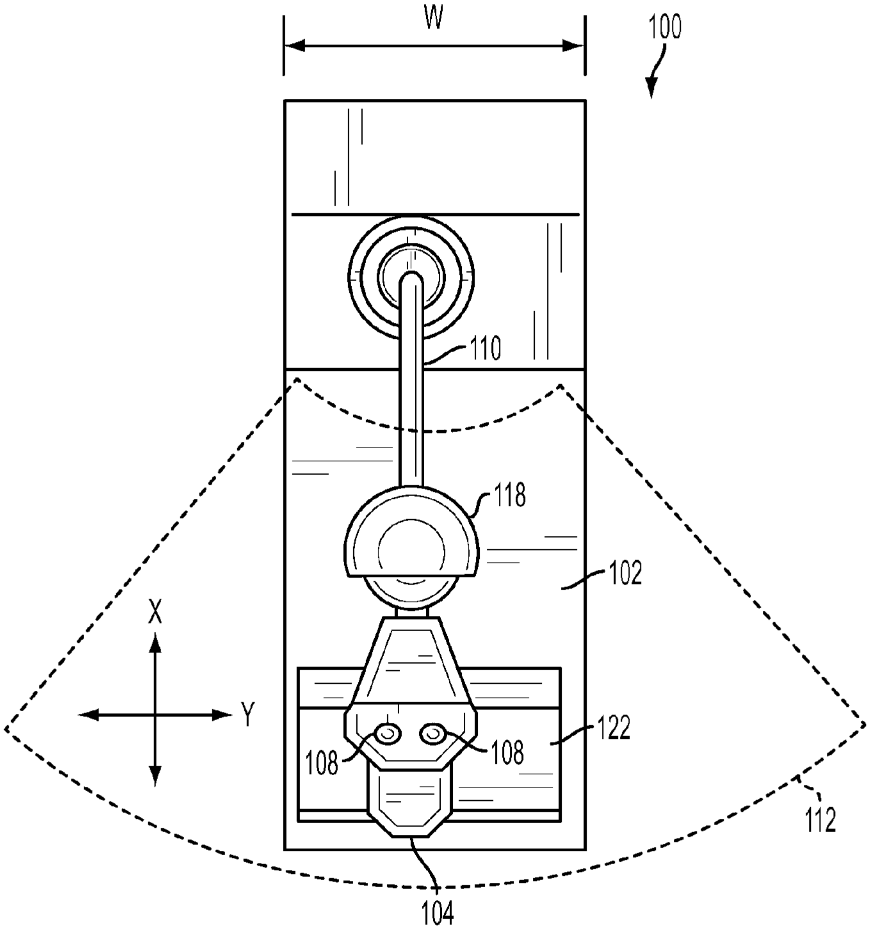
FIG. 1 is a top view of a compact haptic interface which is useful for understanding the inventive arrangements.
Figure 2:
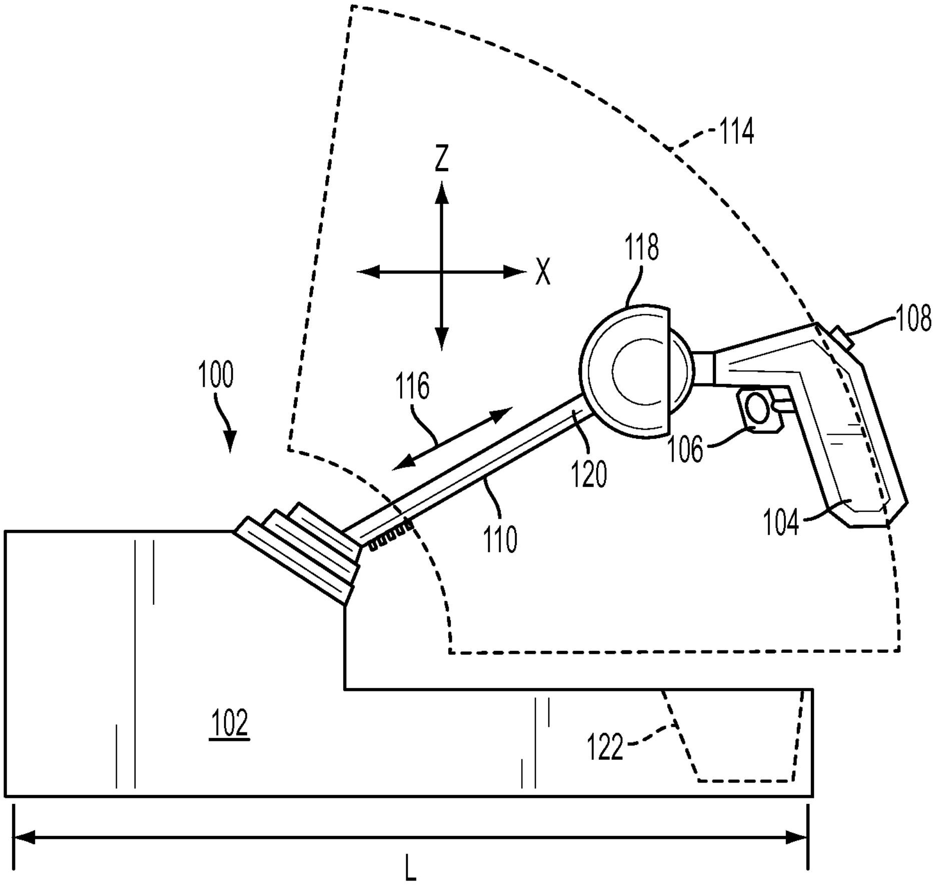
FIG. 2 is a side view of the compact haptic interface in FIG. 1.

Referring now to FIG. 1, there is shown a top view of a compact haptic interface 100. A base 102 of the interface is advantageously designed to have a relatively narrow width W so that it can fit conveniently in a space adjacent to one side of a primary robot control system (e.g. a laptop computer). An overall length L of the base is not critical but can be selected to approximately correspond in size to a laptop computer. The compact haptic interface 100 is designed to facilitate a human-machine interaction for controlling a robot device. As such, the interface can include a grip 104 which is ergonomically sized and shaped to facilitate grasping by a human hand. The grip 104 can be a pistol-style grip as shown, and can include one or more interface control elements. For example, a trigger control 106 can be provided on one side of the grip. One or more control switches 108 can also be provided on the grip. A grip well 122 can optionally be provided for compact storage of the grip when the interface is not in use.

The compact haptic interface includes an elongated rod 110. The grip is connected to the rod 110 at a grip end 120 by means of a wrist joint 118. The wrist joint facilitates movement of the grip relative to the rod. For example, the wrist joint can facilitate rotation of grip about one or more axes of rotation. According to one aspect, the wrist joint 118 can be a ball and socket joint which facilitates rotation of the grip about three orthogonal axis.

The rod 110 functions as a joystick and is movable relative to the base 102 as hereinafter described. The movement of the rod allows the grip 104 to move within a generally arcuate range of motion defined by a workspace boundary 112 in FIG. 1. The grip end 120 is also movable within an arcuate range of motion defined by a workspace boundary 114. The rod 110 is also movable along a linear path aligned with the rod 110 as shown by arrow 116. As such, the grip 104 can be linearly displaced in a direction which is either toward or away from the base 102. The mechanisms for facilitating these movements of the grip will be described in further detail as the discussion progresses.

Figure 3:
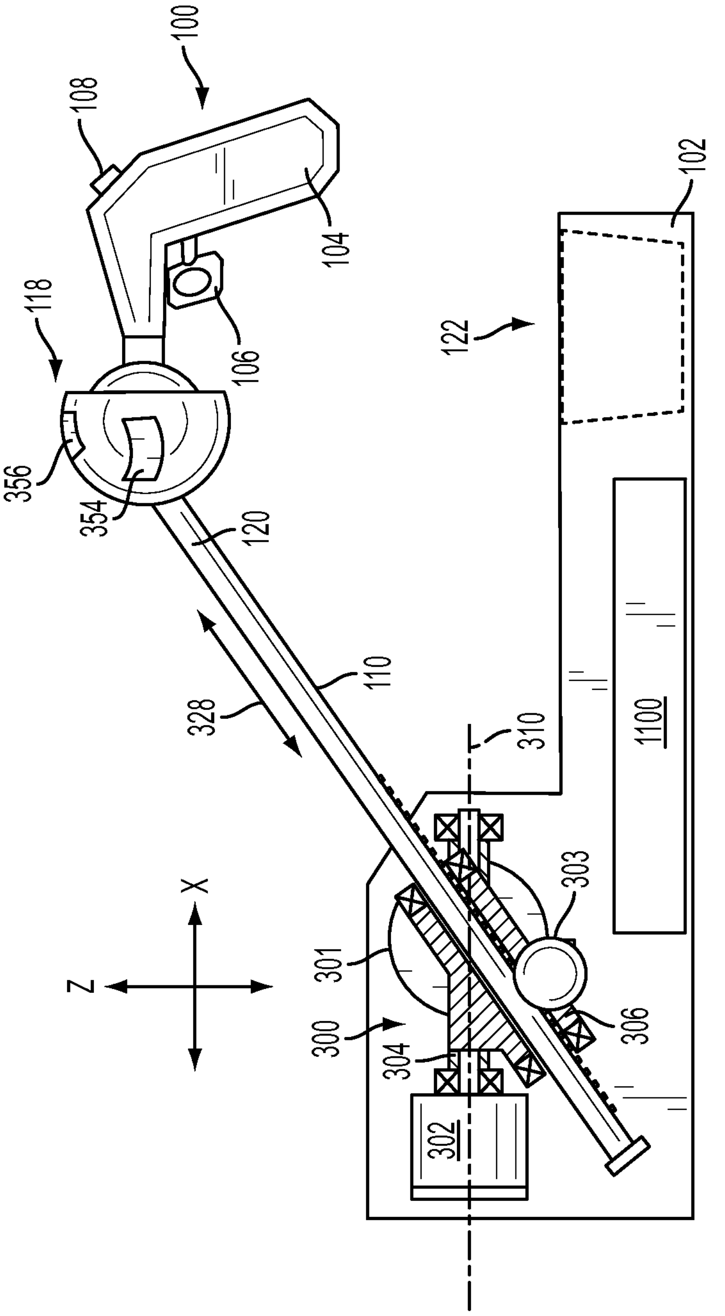
FIG. 3 is a side view of the compact haptic interface in FIG. 1, with a carrier element shown in partial cutaway, which is useful for understanding an internal mechanism.
Figure 4:
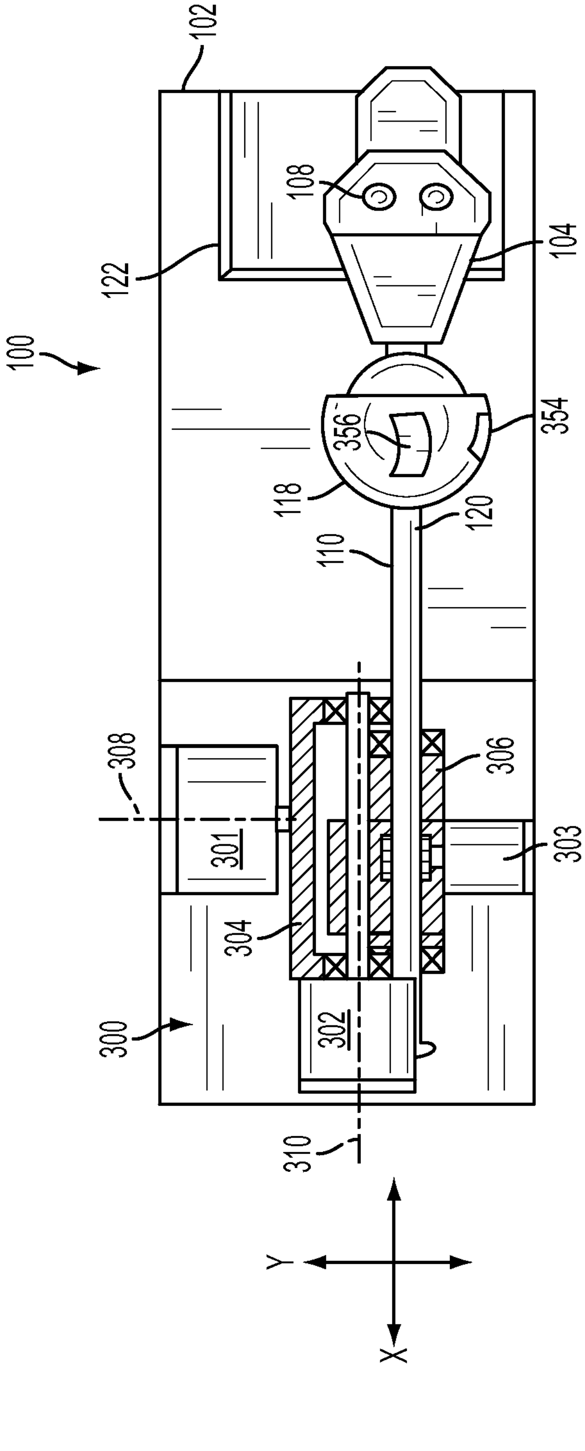
FIG. 4 is a top view of compact haptic interface in FIG. 1, with a carrier element shown in partial cutaway, which is useful for understanding the internal mechanism.

Referring now to FIGS. 3 and 4 the compact haptic interface 100 is shown in partial cutaway to reveal an internal mechanism 300. Enlarged views of the internal mechanism 300 are provided in FIGS. 5-7 to illustrate certain details of the inventive arrangements. The internal mechanism includes a first motor 301 which is securely mounted to the base 102 in a fixed position. The first motor is a rotary type motor and can be electrically operated. The first motor is securely attached to the base by any suitable means. For example, motor brackets, screws or other types of fasteners can be used for this purpose. To provide greater clarity in the drawings, the attachment mechanism for the motor is not shown.

Figure 6:
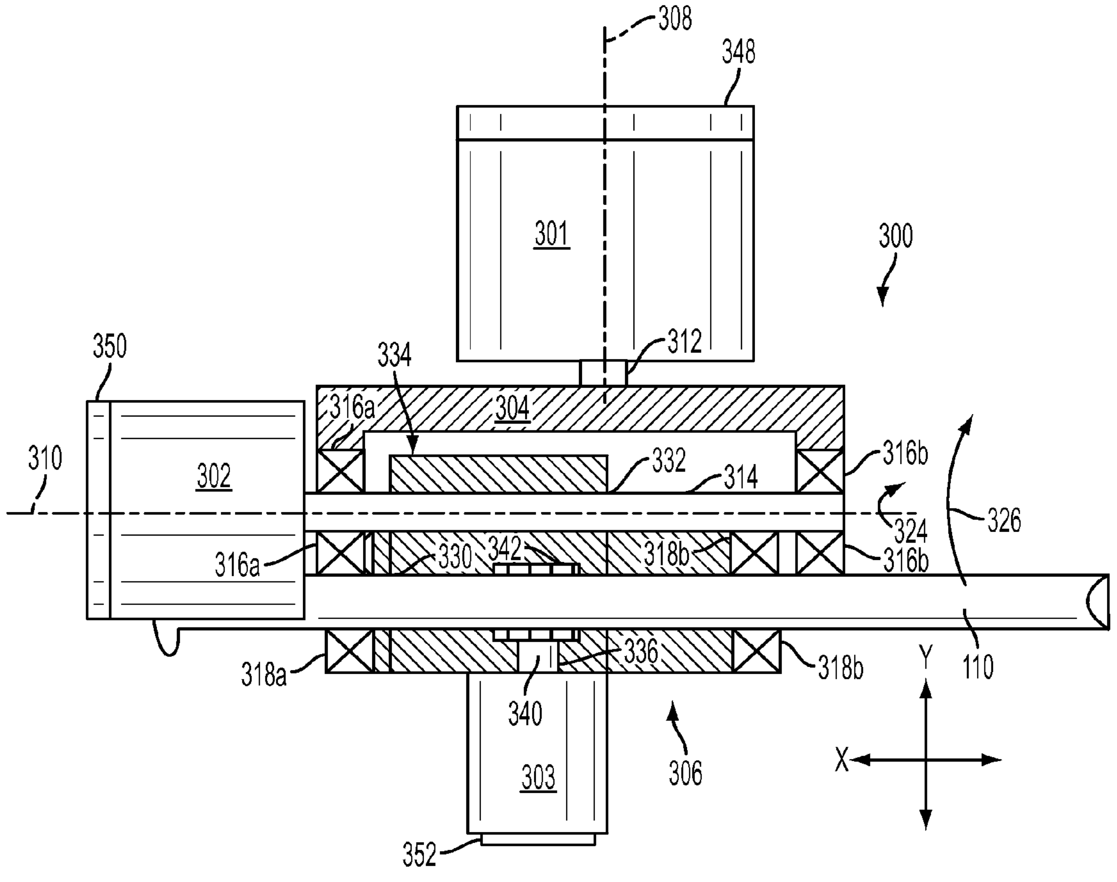
FIG. 6 is an enlarged top view of the internal mechanism shown in FIG. 3

A yoke 304 is rotatably mounted with respect to the base 102, and a carrier 306 is rotatably mounted with respect to the yoke. The first motor 301 is mechanically coupled to the yoke by means of a drive coupling 312 so as to cause rotation of the yoke about a yoke axis 308. In certain embodiments of the invention as described herein, it can be advantageous to mount the first motor 301 so that its axis of rotation is aligned with the yoke axis of rotation. As best shown in FIGS. 4 and 6, this would mean that the first motor axis of rotation and yoke axis are each generally aligned parallel with the y axis.

Figure 5:
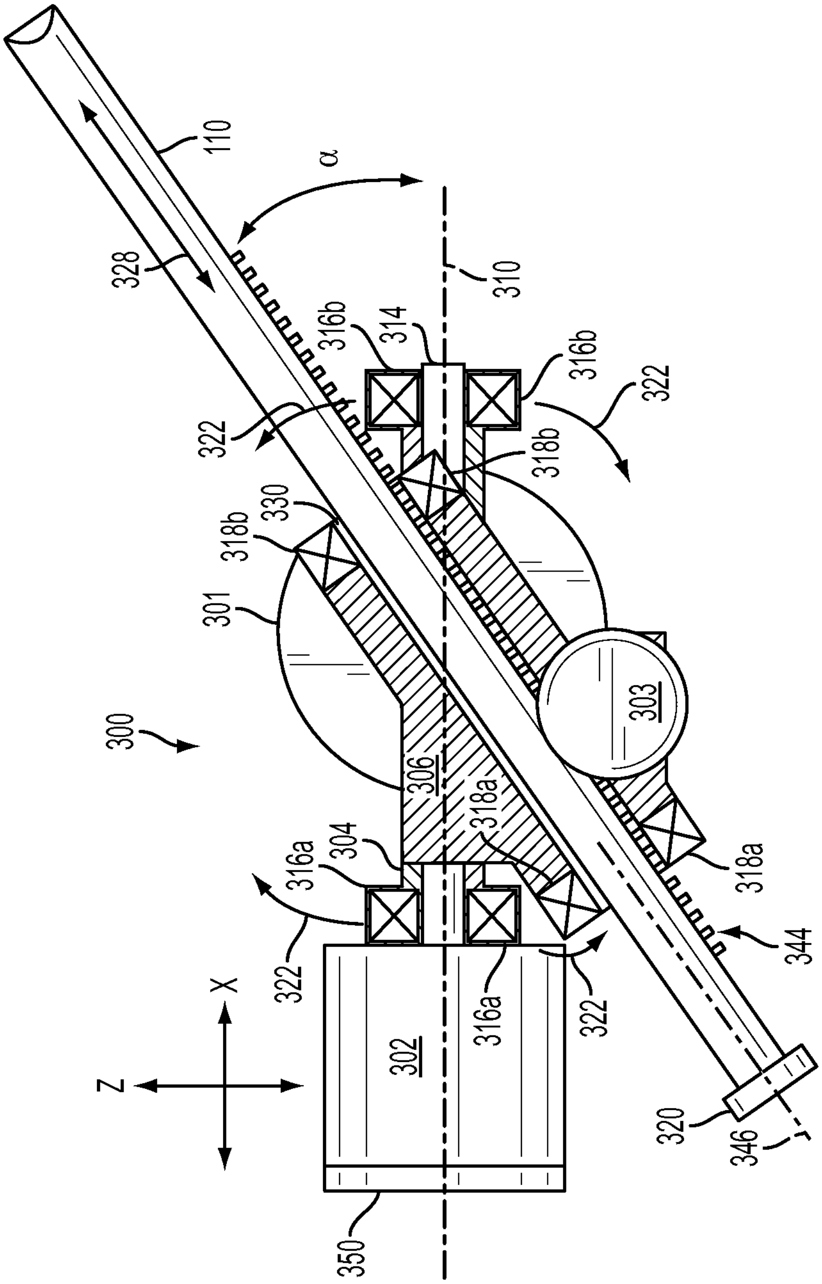
FIG. 5 is an enlarged side view of the internal mechanism in FIG. 3, with a carrier shown in partial cutaway to reveal internal detail.

The first motor 301 and first drive coupling 312 are arranged to facilitate rotation of the yoke about the yoke axis 308 responsive to operation of the first motor. Rotation of the yoke about the yoke axis is illustrated in FIG. 5 by arrows 322. The first drive coupling 312 in this scenario is a rotatable drive shaft which communicates output torque directly from the first motor 301 to the yoke. Accordingly, the rotatable drive shaft directly facilitates rotation of the yoke within the base 102. Still, the invention is not limited with regard to a particular drive coupling and other arrangements are also possible. For example, a gear box (not shown) can be used for the purpose of communicating motor torque to the yoke. Similarly, a drive belt and pulley arrangement (not shown) could be used for this purpose. If a gear drive or belt drive is used, then a conventional axle and bearing arrangement (not shown) may be used to facilitate support of the yoke within the base 102 and rotation of the yoke about the yoke axis 308.

A second motor 302 is mechanically coupled to the yoke 304. As such, the second motor rotates with the yoke about the yoke axis. The second motor is a rotary type motor and can be electrically powered. The second motor is securely attached to the yoke by suitable means. For example, motor brackets, screws or other types of fasteners can be used for this purpose. To provide greater clarity in the drawings, the attachment mechanism for the second motor is not shown. The second motor is operatively connected to a second drive coupling. In the exemplary arrangement shown, the second drive coupling is comprised of a drive shaft 314. The drive shaft is arranged to rotate within the yoke 304 on bearings 316*a*, 316*b*. In the arrangement shown, the drive shaft 314 is directly coupled to the second motor 302, but it should be appreciated that the invention is not limited in this regard. For example, a gear box (not shown) can be used for the purpose of communicating motor torque to the drive shaft 314. Similarly, a drive belt and pulley arrangement (not shown) could be used for this purpose.

Figure 7:
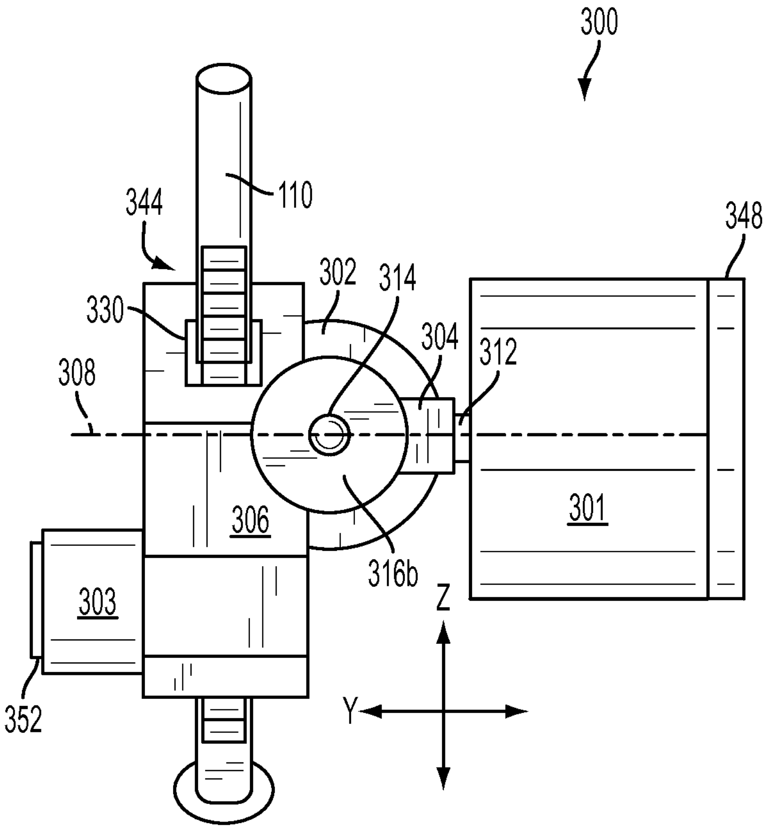
FIG. 7 is an enlarged front view of the internal mechanism shown in FIG. 3, with a carrier shown in partial cutaway to reveal internal details.
Figure 8A:
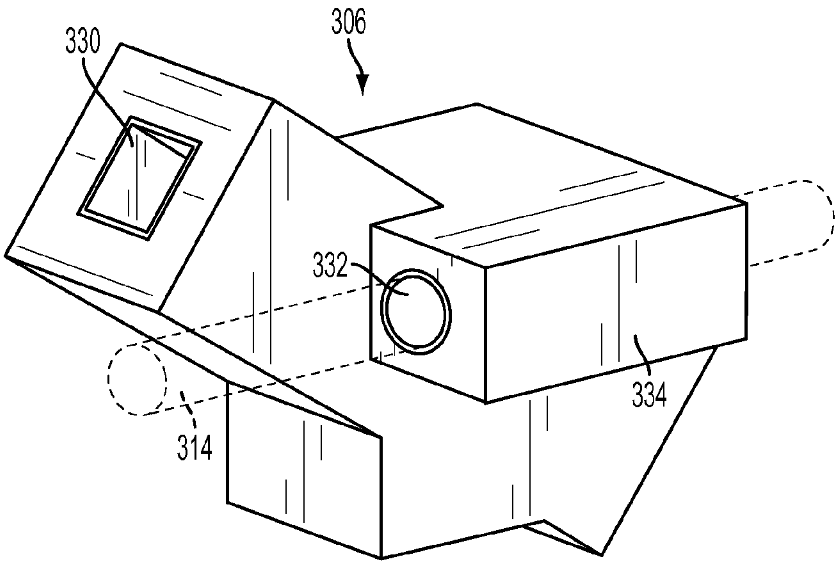
FIG. 8A is a right side perspective view of a carrier portion of the internal mechanism in FIG. 3.
Figure 8B:
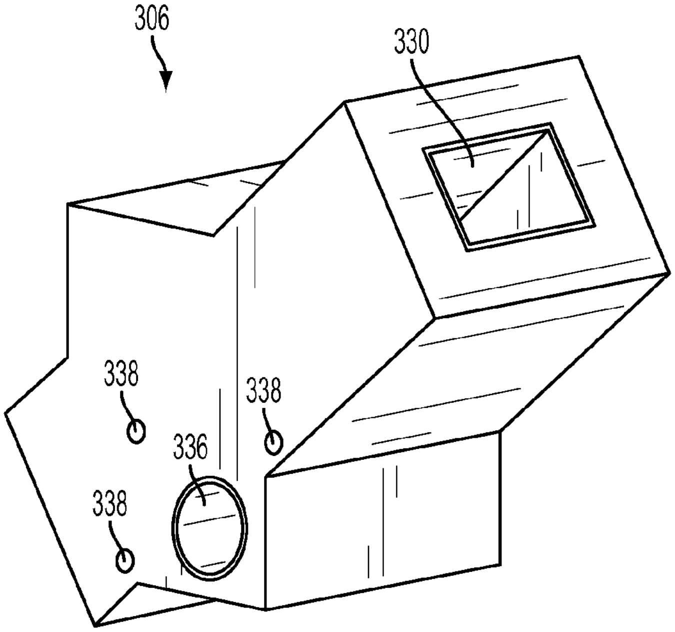
FIG. 8B is a left side perspective view of a carrier portion of the internal mechanism in FIG. 3.

As shown in FIGS. 3-7, the internal mechanism 300 includes a carrier 306. Additional details of the carrier are shown in FIGS. 8A and 8B. The carrier 306 includes a wing 334 which has a bore 332 formed therein. As best shown in FIG. 6, the drive shaft 314 extends through the bore 332 and is keyed therein so as to fix the carrier to drive shaft. Accordingly, rotation 324 of the drive shaft 314 causes the entire carrier 306 to rotate around the carrier axis of rotation 310. The rotation of the carrier is indicated in FIG. 6 by arrow 326. Notably, the carrier axis of rotation 310 is transverse to the yoke axis of rotation 308. For example, the carrier axis of rotation 310 can be perpendicular to the yoke axis of rotation 308 as shown in FIGS. 4 and 6.

Referring now to FIG. 5, it can be observed that a rod guide structure 330 is provided in the carrier 306. An elongated length of the rod guide structure 330 is disposed between rod support bearings 318*a*, 318*b*. In the exemplary arrangement shown in FIG. 5, the rod guide structure 330 basically forms a channel within the carrier 306 which extends between the support bearings at opposing ends of the carrier. It can be observed in FIG. 6 that the channel extends along a direction aligned with rod axis 346 that is transverse to the yoke axis of rotation 308. Notably, the elongated length of the channel is also aligned along a direction that is transverse to the carrier axis of rotation 310. This transverse orientation of the rod guide structure with respect to the carrier axis 310 is best understood with reference to FIG. 5. As explained below in further detail, the channel forms an angle $\alpha$ relative to the carrier axis of rotation 310.

The rod 110 is disposed within the rod guide structure 330. The rod 110 is guided within the rod guide structure 330 by the support bearings 318*a*, 318*b* so that it can move or slide within the rod guide structure 330 along a linear direction shown by arrow 328. A stop 320 is provided at a base end of the rod 110 to prevent the rod from being moved or pulled out of the rod guide structure 330.

Figure 12A:
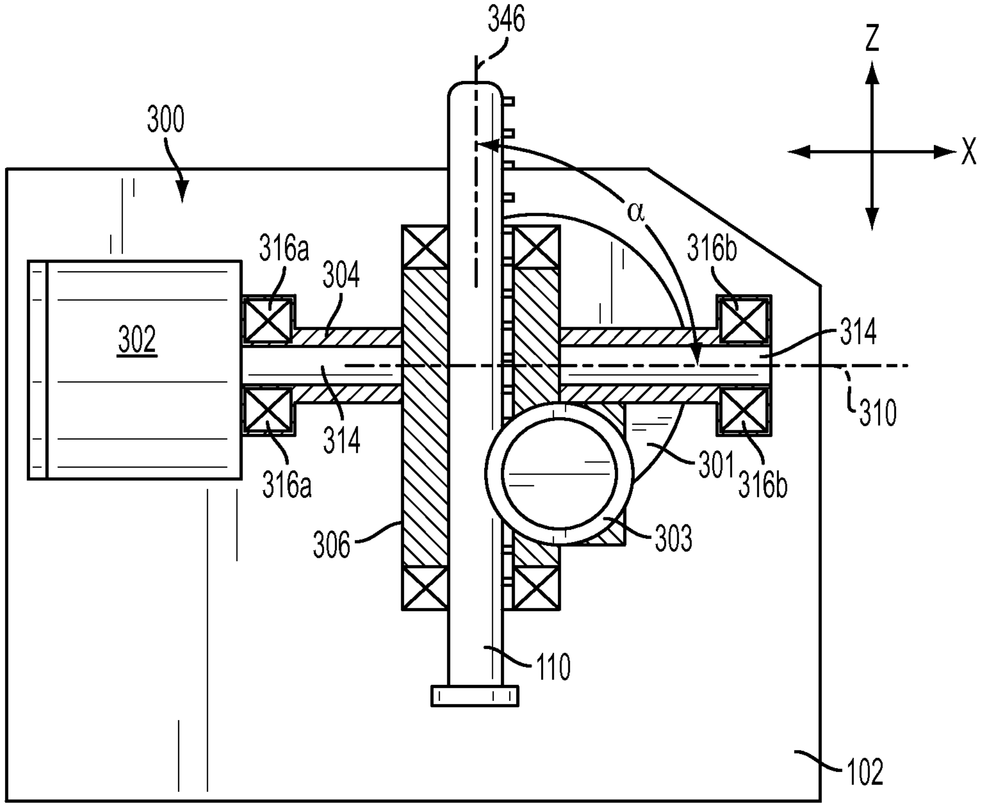
FIG. 12A is side view which is useful for understanding an alternative carrier configuration for the internal mechanism in FIG. 3.
Figure 12B:
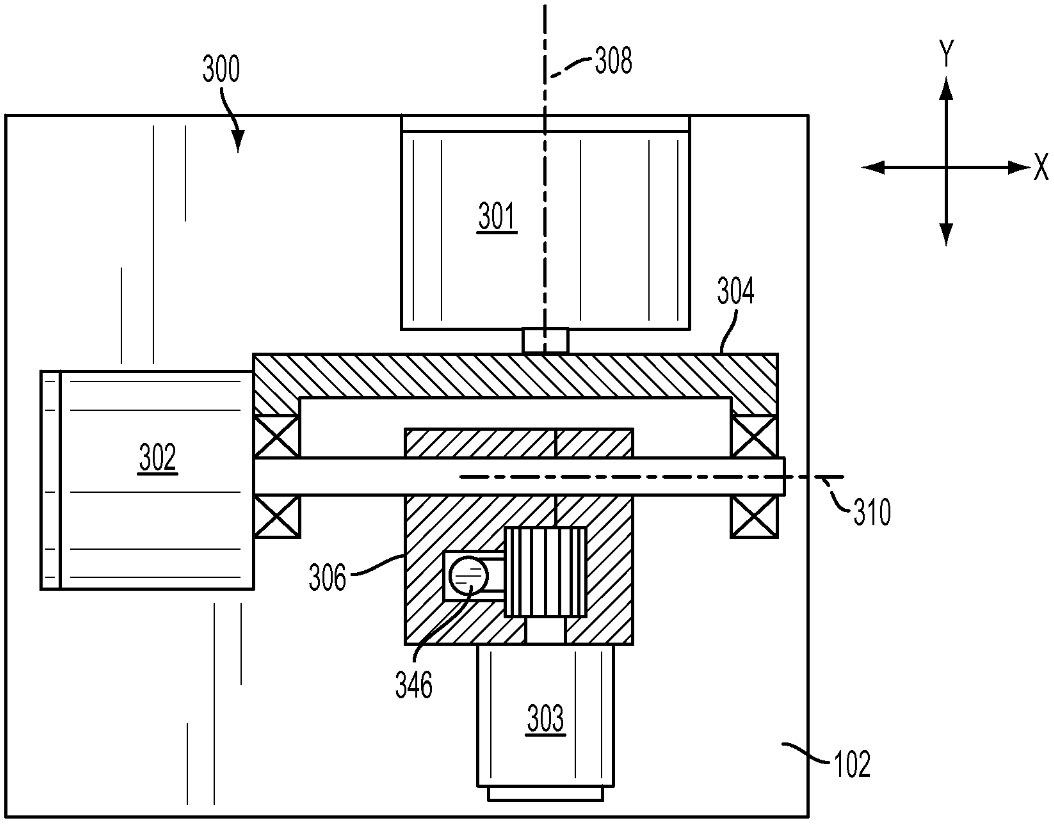
FIG. 12B is top view of the alternative carrier configuration in FIG. 12A.

The rod axis 346 is aligned along a direction of the elongated length of the rod 110. As may be observed in FIG. 5, the rod axis 346 forms an angle $\alpha$ with respect to the carrier axis of rotation 310. The angle $\alpha$ can be between about 10° to about 90°. An exemplary scenario in which the angle $\alpha$ is approximately 90° is shown in FIGS. 12A and 12B. From the foregoing, it will be understood that the rod axis 346 is aligned along a direction that is transverse to the carrier axis of rotation 310. As shown in FIG. 6, the elongated length of the rod is also aligned along a direction that is transverse to the yoke axis of rotation 308.

A third motor 303 is mechanically attached to the carrier 306. The third motor is thus supported on the carrier and rotatable with the carrier about the carrier axis of rotation. The third motor is a rotary type motor and can be electrically powered. The third motor is securely attached to the carrier by suitable means. For example, motor brackets, screws or other types of fasteners can be used for this purpose. Screw holes 336 can be provided on a side of the carrier 306 to facilitate the motor attachment as described herein. To provide greater clarity in the drawings, the attachment mechanism for the second motor is not shown. The third motor is operatively connected to a third drive coupling. In the exemplary arrangement shown, the third drive coupling is simply comprised of a drive shaft 340 which extends through a bore 336 disposed in the carrier 306. However, as with the other drive couplings described herein, alternative embodiments are possible. The drive shaft 340 is arranged to rotate within the bore 336 when the motor 303 is operated. A pinion gear 342 is mounted on the drive shaft 340 and is positioned to engage a rack gear 344 disposed on the rod 110. When the pinion gear is rotated by drive shaft 340, it engages the rack gear 344 to cause linear motion of the rod 110 along a direction indicated by arrows 328.

The internal mechanism 300 can further include one or more encoders or sensors to detect a position of the motors 301, 302, 303. For example, FIGS. 5-7 show encoders 348, 350 and 352 which are arranged to detect a rotational position of motors 301, 302, and 303 respectively. Positional encoders and/or sensors are well known in the art and therefore will not be described here in detail. As an alternative to providing encoders 348, 350, 352 to detect a motor position, similar encoders can be used to detect a rotational position of the yoke 304 on the yoke axis 308, a rotational position of the carrier on the carrier axis 310, or a linear displacement position of rod 110 within the rod guide structure 330. One or more grip encoder 354, 356 can optionally be provided to sense movement of the grip relative to the grip end of the rod. However, such grip encoders are not required.

As shown in FIG. 3, a compact haptic interface as described herein will include an interface control unit 1100 which is arranged to receive input signals from the encoders 348, 350, 352. The interface control unit 1100 is also configured to produce at least one output control signal for controlling operation of the motors 301, 302, 303. As such, the interface control unit 1100 is arranged to receive haptic feedback signals, and to activate in response to such haptic control signals at least one of the first, second and third motors. As such, the interface control unit can produce a haptic force at the grip 104.

Figure 9A:
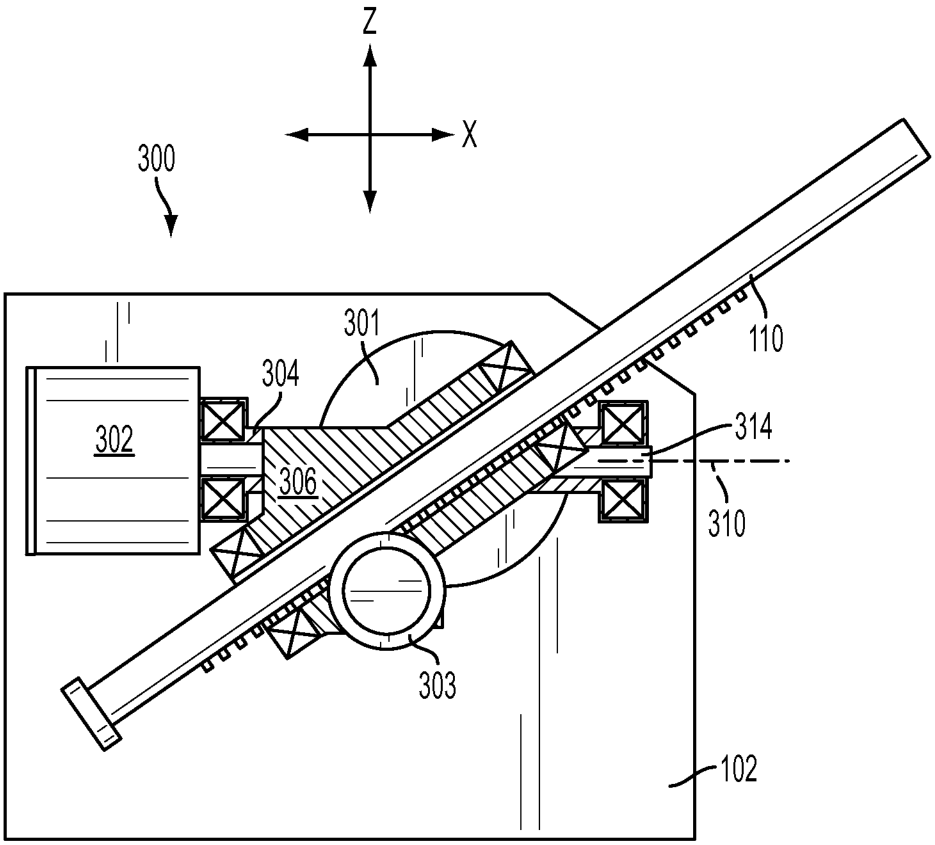
FIGS. 9A and 9B are side views of the internal mechanism in FIG. 3 with a carrier element shown in partial cutaway to reveal internal detail, that are useful for understanding a relative movement of certain components.
Figure 9B:
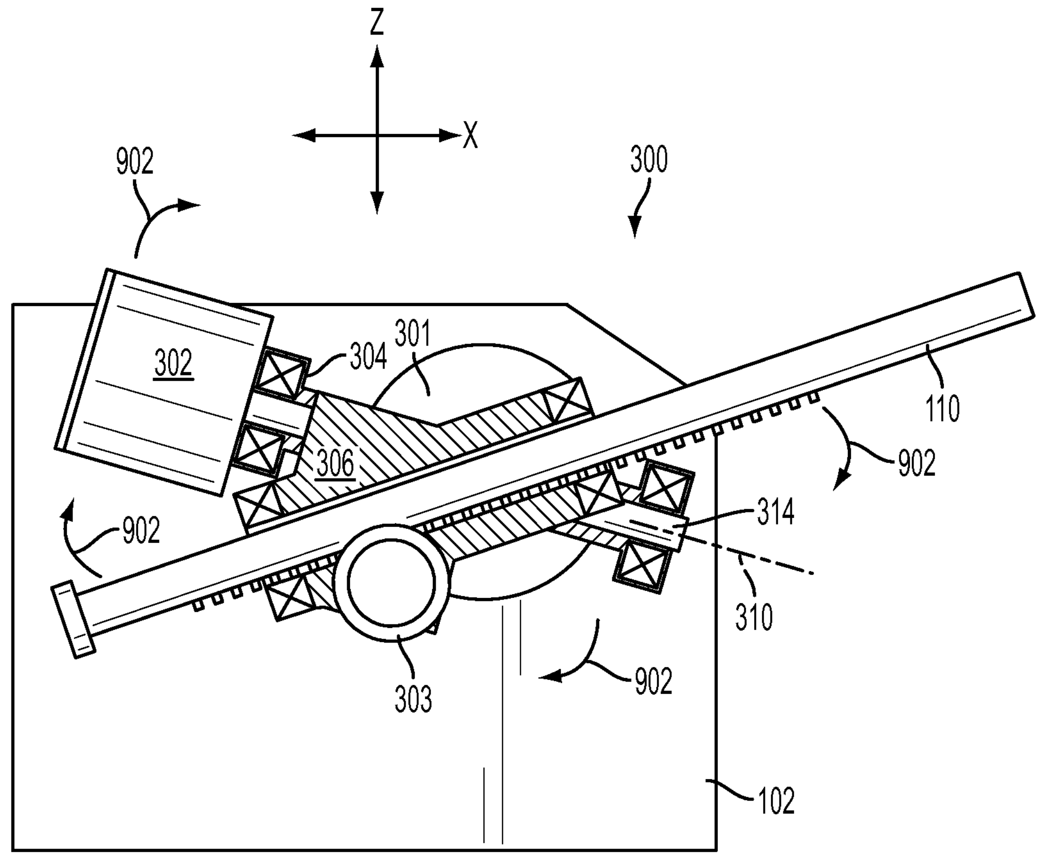

Haptic forces are provided in human machine interfaces based on feedback from remotely controlled robotic devices and are usually intended to simulate to the user the forces that are actually experienced by the robotic device. Sensors provided at the robot can detect forces experienced by the robot and can be used to generate haptic feedback signals. These feedback signals are used as a basis for controlling haptic motors 301, 302, 303. To create a realistic haptic environment, the first, second and third motors 301, 302, 303 produce haptic forces in the x, y and z directions. FIG. 9A shows the yoke 304 in a first position and FIG. 9B shows the same yoke rotated by the first motor 301. In FIG. 9B rotation of the rod 110 is indicated by arrows 902. The first motor 301 provides a motive force to rotate the rod 110 (and grip 104) about the yoke axis 308 for movement in the x, z plane.

Figure 10A:
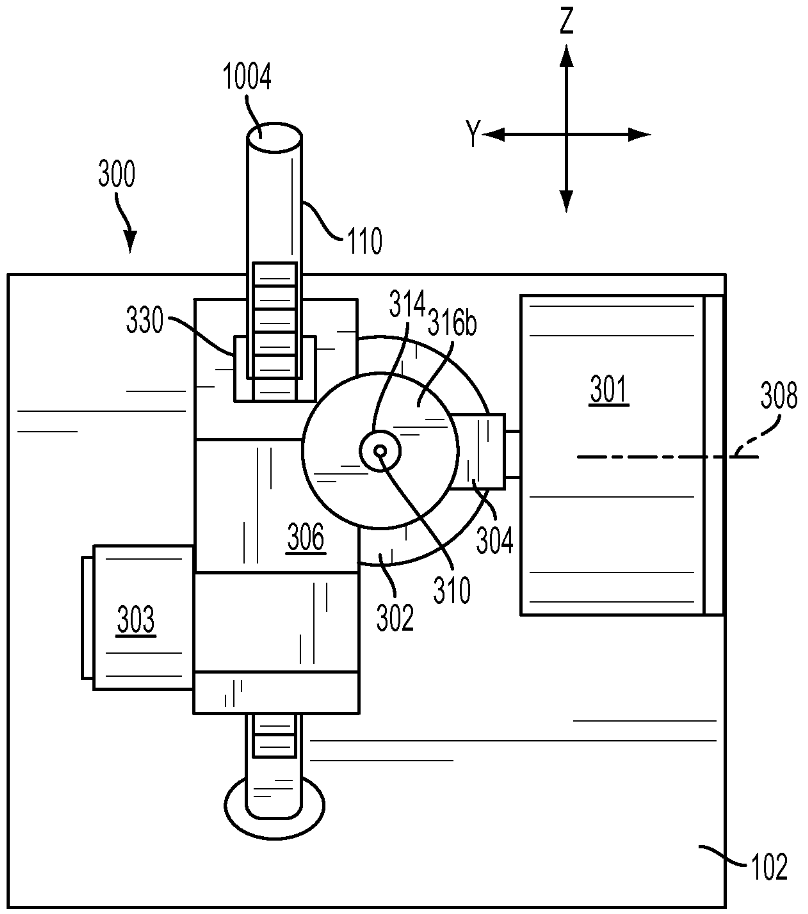
FIGS. 10A and 10B are front views of the internal mechanism in FIG. 3 that are useful for understanding a relative movement of certain components.
Figure 10B:
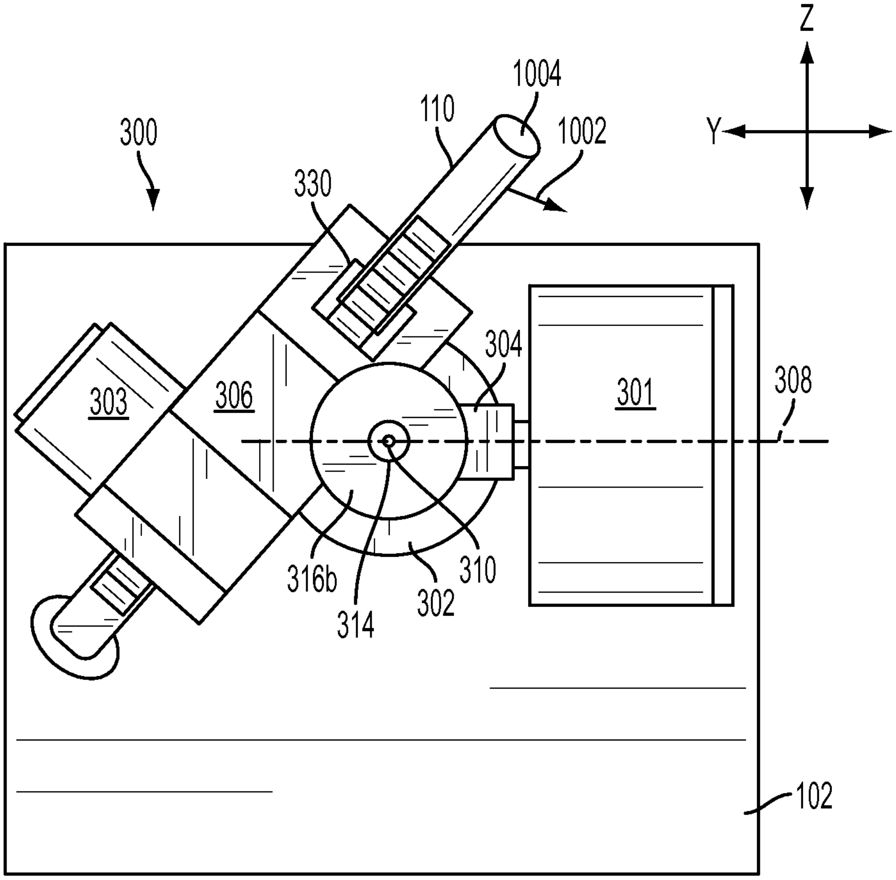

Referring now to FIGS. 10A and 10B the motion of the rod and the carrier is shown in further detail. As may be understood from FIG. 10A, the rod is at a first location with respect to the y axis when the carrier 306 is in a first rotational position about a carrier axis 310 (which extends into the page in FIGS. 10A and 10B. When the second motor 302 causes rotation of the carrier about the carrier axis 310, the transverse orientation of the rod 110 with respect to the carrier axis 310 causes displacement of the rod end 1004 in the y direction as indicated by arrow 1002. Movement in the opposite y direction will be obtained by reversing the operating rotation of motor 302. Notably, the rod end 1004 will also displace somewhat in the z direction as it rotates about the carrier axis, depending on the angle $\alpha$ which has been selected.

It will be appreciated by those skilled in the art that operation of first motor 301, will not exclusively provide displacement of a grip 104 in a z direction. Instead, some displacement of the grip will also occur in the x direction as the grip 104 rotates around the yoke axis. Also, when the carrier is rotated around the carrier axis as shown in FIG. 10B, the grip end of the rod will be displaced in the y direction, but some displacement will also occur in the z direction. Similarly, linear movement of the rod 110 will not provide displacement exclusively along the x or z direction, but will be some combination thereof. Given the foregoing, the operation of one or more of the motors 301, 302, 303 can be selectively controlled concurrently to produce a desired force at the grip 104. The exact motion rotation required for producing a required haptic force in response to robot feedback is advantageously determined by the controller 1100.

In conventional systems the motors used to provide haptic feedback forces in the x, y, and z direction can be all approximately the same size so as to produce approximately the same amount of force in each direction. More particularly, a haptic interface can be designed so that similar amounts of haptic force are capable of being produced at the interface grip in each of the x, y and z directions. However, empirical studies have shown that human interaction with a robot is usually such that the greatest amounts of haptic force are needed in the z direction. Haptic force are often needed in the x and y directions too, but the magnitude of such forces tend to be less as compared to those needed in directions along the z axis. These differences are generally due to the way in which people tend to approach robot grasping and manipulation tasks. Accordingly, in the compact haptic interface 100, it is advantageous to select the first motor 301, which is used to generate haptic forces in the z direction, as a larger, more powerful motor as compared to the second and third motors 302, 303. Hence, a greater magnitude of haptic force can be produced in the z direction as compared to the x or y direction.

If the first motor 301 is larger and more powerful as compared to motors 301, 302 then it is also desirable for the first motor 301 to be mounted to the base 102. Such an arrangement facilitates less rotating mass since a housing associated with the largest, most powerful motor 301, does not move when the grip 104 is moved. This approach also allows for a lighter weigh yoke 304 and carrier 306 since the weight of motors 302 and 303 is less than motor 301, and the forces exerted upon the support structures by motors 302, 303 will be less as compared to motor 301. The mechanism provides maximum haptic force in directions aligned with the x-z plane while maintaining a very narrow footprint that is well suited for use adjacent to a primary control device, such as a laptop computer.

Figure 11:
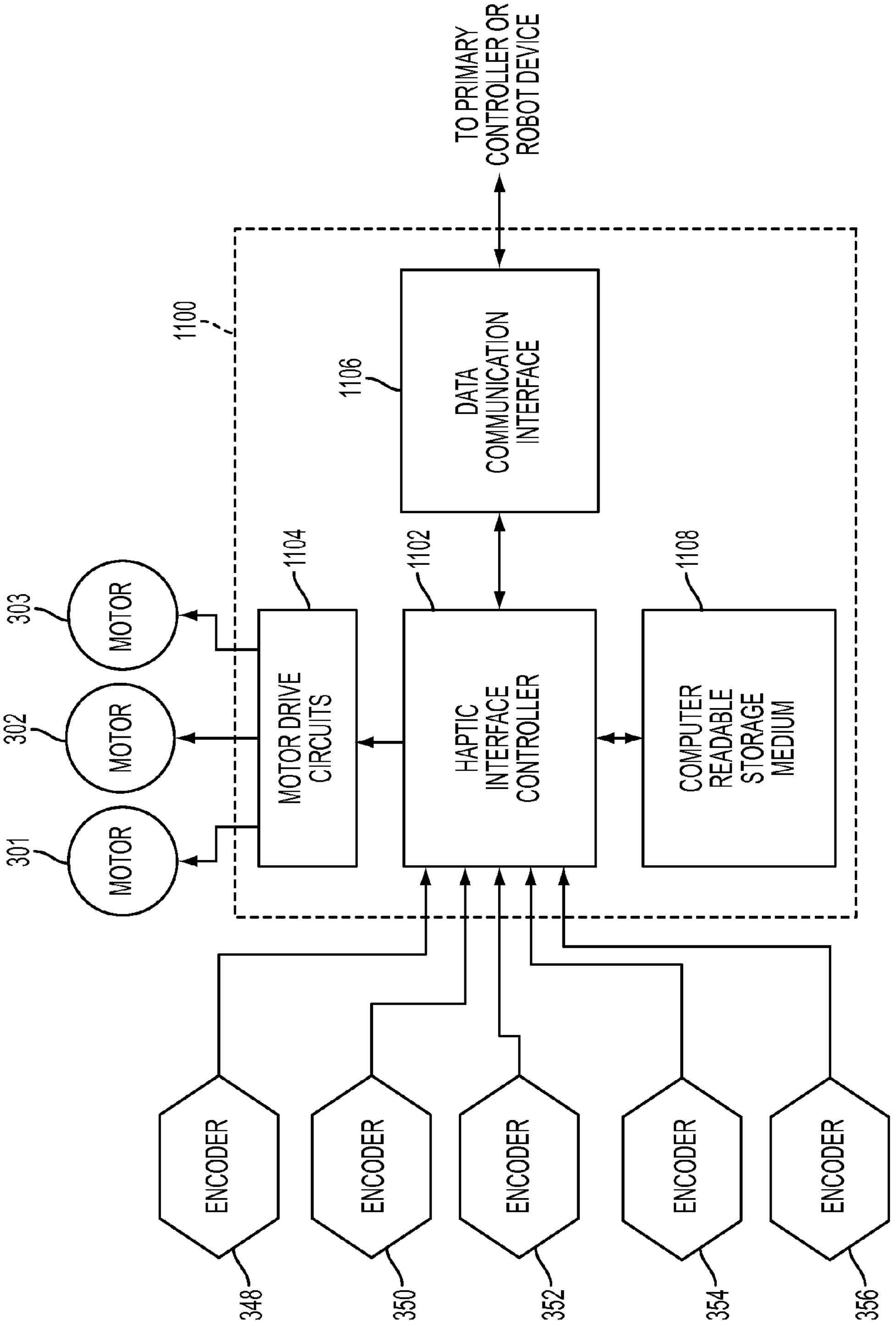
FIG. 11 is a control system block diagram for the compact haptic interface that is useful for understanding the inventive arrangements.

A control system 1100 is provided within the base for monitoring, controlling and coordinating the operation of the various components of the compact haptic interface 100. Referring now to FIG. 11 there is provided a schematic drawing of an exemplary control system 1100. The control system 1100 includes a haptic interface controller 1102, motor drive circuits 1104 and a data communication interface 1106. The haptic interface controller 1102 can be an electronic circuit such as a microprocessor, a micro-controller, an application specific integrated circuit, or any other suitable electronic processing device which is capable of carrying out the functions of a haptic interface controller as described herein. According to one aspect of the invention, a computer readable storage medium 1108 can be provided for storing one or more sets of instructions for controlling the operation of the haptic interface controller. The computer readable storage medium can have computer-usable program code embodied in the medium. The program code can include a software application, computer software routine, and/or other variants of these terms referring to an expression, in any language, code, or notation, of a set of instructions intended to cause a system having an information processing capability to perform a particular function.

The haptic interface controller 1102 receives position input signals from encoders which specify a position of the grip 204 as it is moved within a workspace boundary 112, 114. For example, encoders 348, 350, 352, 354, 356 can be used for this purpose since they will detect movement of the grip in response to user control inputs. A data communication interface 1106 facilitates communications between the haptic interface controller 1102 and a primary robot controller (not shown), such as a laptop computer. As such, the data communication interface 1106 can be configured to implement a wired or wireless communication session with the primary robot controller. The haptic interface controller 1102 uses inputs from the encoders to generate output control signals which are useful for controlling a robot device (not shown). These output control signals are communicated from the haptic interface controller 1102 to the data communication interface 1106. The data communication interface will communicate such robot control signals to a primary robot controller (not shown), which uses the control signals to generate motion commands. These motion commands are then communicated to the robot device over a suitable data link.

Haptic sensors in the robot device will detect forces that are applied to the robot device. The information from these haptic sensors will be communicated as haptic feedback data to the primary robot controller and then to the data communication interface 1106. The haptic feedback data will then be provided to the haptic interface controller 1102. Based on the haptic feedback data, the haptic interface controller will generate signals to motor drive circuits 1104 to control the operation of haptic feedback motors (e.g. first motor 301, second motor 302, and third motor 303). The haptic interface controller can include processing facilities to determine the appropriate operations needed from each of the motors in order to achieve a desired haptic feedback force at the grip 104.

For purposes of describing the invention, it has been assumed that the compact haptic interface 100 is not a primary robot controller but instead serves primarily as a human-machine interface with respect to such a primary robot controller. However, it should be appreciated that the invention is not limited in this regard and the functions of a primary robot controller can be integrated into the compact haptic interface 100 described herein. Primary robot controllers are well known in the art and therefore will not be described here in detail.

Figure 13:
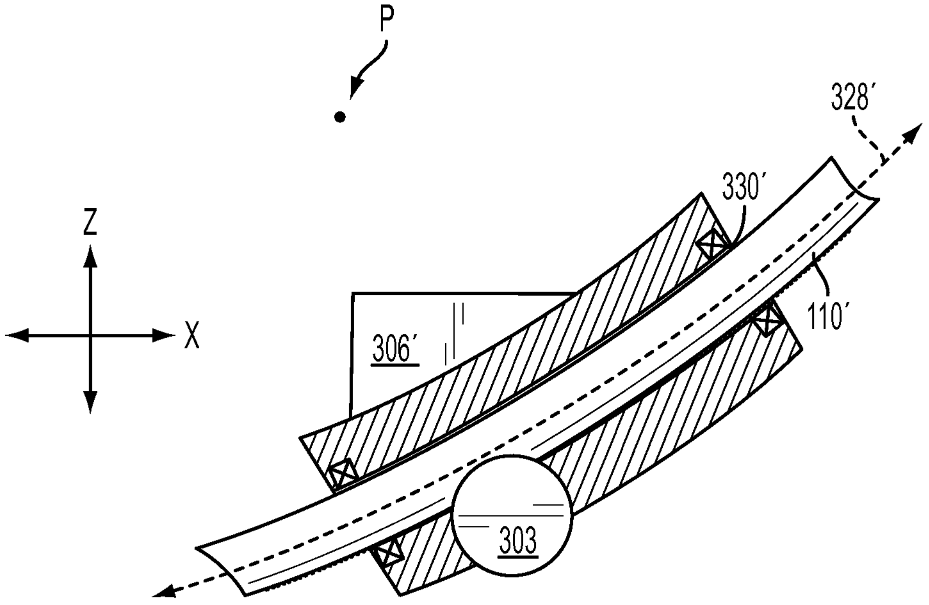
FIG. 13 is an enlarged side view showing an alternative embodiment of the carrier in partial cutaway to reveal internal detail.

In the inventive arrangements illustrated in FIGS. 5, 9A and 9B the rod 110 is shown to be a substantially linear element. The rod guide structure 330 is arranged to accommodate the linear form of the rod such that the rod 110 is guided within the rod guide structure 330 by the support bearings 318*a*, 318*b*. As such, the rod 110 can move or slide within the rod guide structure 330 along a linear direction shown by arrow 328. Such a linear arrangement can be acceptable in many applications. However, in some scenarios it can be advantageous to form the rod such that it defines an arcuate shape or a semi-circular shape along at least a portion of its length. For example, as shown in FIG. 13, the overall length of the rod 110' can be semi-circular or can have an arcuate shape as opposed to straight line. In such a scenario, the rod-guide 330' would advantageously be arranged to form a corresponding curved channel in the carrier 306' so that the rod moves through the rod-guide along an arcuate path 328' as shown. Notably a curved or arcuate design with respect to the rod 110' as described herein can be desirable in certain situations to facilitate a more compact design for the control.

In an exemplary embodiment shown in FIG. 13, the rod 110' can be arranged to curve slightly in an upward direction such that the center of curvature point P of the rod would generally be displaced in the +z direction relative to the length of the rod. With such an arrangement it is less likely that the back end of the rod 110 would hit the bottom of the housing 102 when the user raises the hand grip.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.)

We claim:

1. A compact haptic interface, comprising:

a base;

a yoke rotatably disposed within the base;

a first motor mounted stationary to the base;

a first drive coupling between the first motor and the yoke arranged to facilitate rotation of the yoke about a yoke axis responsive to operation of the motor;

a carrier mounted to said yoke and rotatable about a carrier axis transverse to the yoke axis;

a rod mounted to the carrier, and extending along a rod axis transverse to the yoke axis and the carrier axis, to a grip end spaced apart from the yoke;

a second motor supported on the yoke;

a second drive coupling arranged to facilitate rotation of the carrier about the carrier axis responsive to operation of the second motor;

a third motor supported on the carrier and rotatable with the carrier about the carrier axis of rotation;

a third drive coupling arranged to facilitate linear movement of the rod along a linear direction defined by the rod axis responsive to operation of the third motor; and a grip assembly disposed at the grip end including a grip which movable relative to the grip end.

2. The compact haptic interface according to claim 1, further comprising at least one encoder configured to sense movement of the yoke, the carrier and the rod with respect to the base.

3. The compact haptic interface according to claim 2, further comprising an interface control unit arranged to receive input signals from the at least one encoder and produce at least one output control signal.

4. The compact haptic interface according to claim 1, further comprising an interface control unit arranged to receive haptic feedback signals, and to activate in response at least one of the first, second and third motors to produce a haptic force at the grip.

5. The compact haptic interface according to 1, wherein the grip assembly further comprises a ball and socket joint disposed between the grip and the grip end of the rod.

6. The compact haptic interface according to claim 5, further comprising at least one grip encoder which senses movement of the grip relative to the grip end of the rod.

7. The compact haptic interface according to claim 1, wherein the third drive coupling is comprised of a rack gear and a pinion gear.

8. The compact haptic interface according to claim 1, wherein the first motor is a rotary motor having an axis of rotation aligned with the yoke axis.

9. The compact haptic interface according to claim 1, wherein the first motor has a larger torque as compared to each of the second and the third motor.

10. The compact haptic interface according to claim 1, wherein the second motor rotates with the yoke about the yoke axis.

11. A compact haptic interface, comprising:

a base;

a yoke rotatably disposed within the base;

a first motor mounted stationary to the base;

a first drive coupling between the first motor and the yoke arranged to facilitate rotation of the yoke about a yoke axis responsive to operation of the motor;

a carrier mounted to said yoke and rotatable about a carrier axis transverse to the yoke axis;

a rod mounted to the carrier, and extending along an arcuate path transverse to the yoke axis and the carrier axis, to a grip end spaced apart from the yoke;

a second motor supported on the yoke;

a second drive coupling arranged to facilitate rotation of the carrier about the carrier axis responsive to operation of the second motor;

a third motor supported on the carrier and rotatable with the carrier about the carrier axis of rotation;

a third drive coupling arranged to facilitate movement of the rod along a direction defined by the arcuate path responsive to operation of the third motor; and a grip assembly disposed at the grip end including a grip which movable relative to the grip end.

12. The compact haptic interface according to claim 11, further comprising at least one encoder configured to sense movement of the yoke, the carrier and the rod with respect to the base.

13. The compact haptic interface according to claim 12, further comprising an interface control unit arranged to receive input signals from the at least one encoder and produce at least one output control signal.

14. The compact haptic interface according to claim 11, further comprising an interface control unit arranged to receive haptic feedback signals, and to activate in response at least one of the first, second and third motors to produce a haptic force at the grip.

15. The compact haptic interface according to 11, wherein the grip assembly further comprises a ball and socket joint disposed between the grip and the grip end of the rod.

16. The compact haptic interface according to claim 15, further comprising at least one grip encoder which senses movement of the grip relative to the grip end of the rod.

17. The compact haptic interface according to claim 11, wherein the third drive coupling is comprised of a rack gear and a pinion gear.

18. The compact haptic interface according to claim 11, wherein the first motor is a rotary motor having an axis of rotation aligned with the yoke axis.

19. The compact haptic interface according to claim 11, wherein the first motor has a larger torque as compared to each of the second and the third motor.

20. The compact haptic interface according to claim 11, wherein the second motor rotates with the yoke about the yoke axis.

* * * * *